Patented Aug. 5, 1941

2,251,526

UNITED STATES PATENT OFFICE 2,251,526

QUININE SOLUTION

Arnold Salomon, Oss, Netherlands, assignor to the firm: N. V. Orgachemia, Oss, Netherlands No Drawing. Application January 28, 1939, Serial No. 253,442. In the Netherlands January 28, 1938

2 Claims. (Cl. 260—284)

This invention relates to quinine preparations suitable for parenteral use. Quinine has been used for combating pneumococcus infections and here a parenteral application is particularly valuable as part of the quinine given in this way is excreted in the lungs and there exerts its action on the pneumococci.

The quinine is generally applied as the monohydrochloride. This substance is only sparingly soluble in water and for that reason it has been proposed to increase its solubility by the addition of urethane or antipyrine. These additions, however, have some disadvantages. The injection of a quinine-urethane solution causes considerable pain. Further it has been found that injection of pyrazolones (the group to which antipyrine also belongs) in some subjects causes agranulocytosis.

The quinine dihydrochloride is well soluble but its solutions are too acid for injection.

Further it is known that solutions of quinine salts become coloured after some time which points to a decomposition by oxidation with the formation of quinotoxine.

Now the object of my invention is to prepare stable concentrated solutions which do not show the above disadvantages.

This can be effected by the addition of acid and reducing substances. The so-called 1.2-endiols are especially suitable. As an example of a 1.2-en-diol the ascorbic acid may be mentioned.

According to one feature of the invention a mono-salt of quinine with an inorganic acid, e. g. the monohydrochloride, is dissolved with about one equivalent of ascorbic acid. I believe that in this way a mixed salt is formed which is very soluble in water the solution having a not too acid reaction. A special advantage is that ascorbic acid retards the decomposition of the quinine on account of its reducing properties.

According to another feature of the invention in the solution so obtained there are incorporated other medicaments such as are desired according to the case to be treated. So in many instances a combination with a calcium therapy is indicated. I have found that in the solutions described above there may be incorporated considerable quantities of calcium-gluconate which is a calcium salt widely used in therapy. The solution may eventually contain more than 3% of calcium-gluconate.

In order that the invention may be well understood the following specific examples are given, quantities of solids being expressed as parts by weight (grams); quantities of liquids as parts by volume (cubic centimetres).

1. 12 parts of ascorbic acid are dissolved in 75 parts of water. To this solution 25 parts of quinine monohydrochloride are added. The quinine salt dissolves completely. After sterilisation the solution is ready for use.

2. A solution is prepared containing in 100 parts 9 parts of calcium-gluconate and 1 part of calcium glucoheptonate. Calcium glucoheptonate has been described by Hesse, Klinische Wochenschrist, 15, 1485–88 (1936—October 10). The chemical properties and mode of preparation are given on page 1468, left column, 4th paragraph.

3. 6 parts of ascorbic acid and 12.5 parts of quinine hydrochloride are dissolved in the calcium solution, the total volume being made up to 100 parts.

It will be understood that the quantities given in the above examples are not limitative. More concentrated as well as more dilute solutions may be prepared. In general the very concentrated solutions are rather viscous; if desired they may be diluted ad libitum.

What I claim is:

1. A stable solution of the monoascorbate of quinine monohydrochloride.

2. The method of preparing a stable quinine-containing solution suited for parenteral administration that comprises dissolving quinine monohydrochloride in water containing an equimolecular proportion of ascorbic acid.

A. SALOMON.